UNITED STATES PATENT OFFICE.

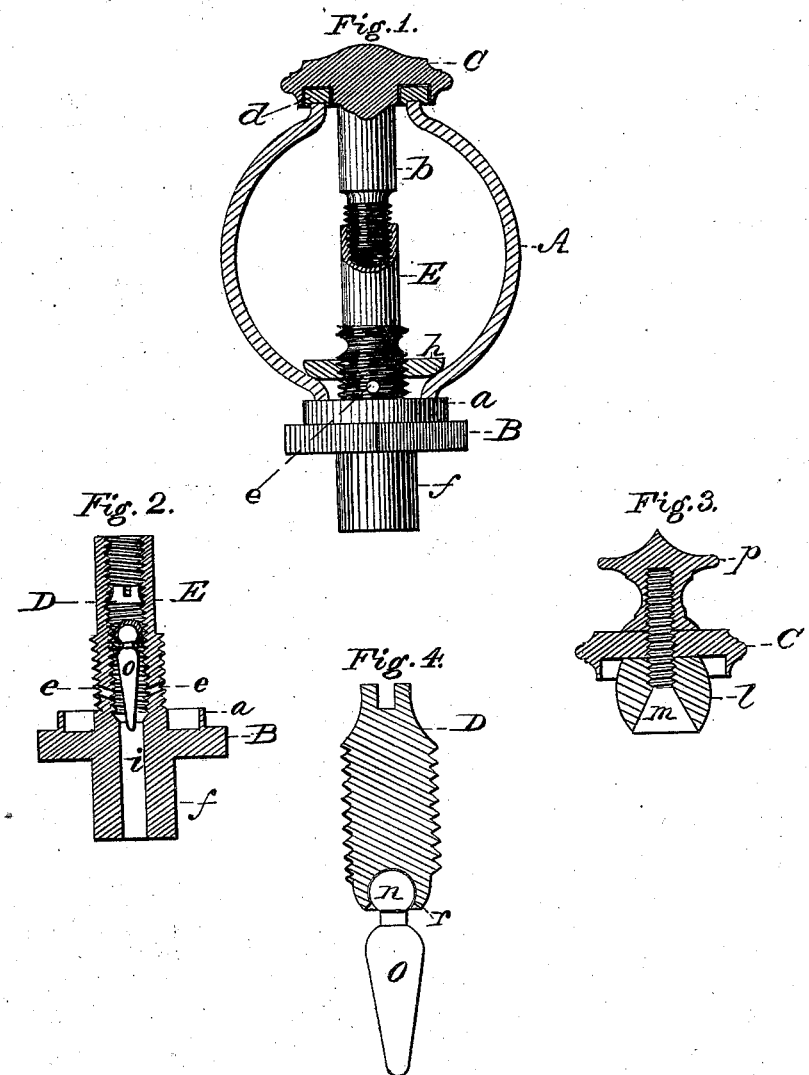

THADDEUS GALVIN, JOHN GALVIN, AND CHARLES LYNCH, OF DETROIT, MICHIGAN.

IMPROVEMENT IN LUBRICATORS.

Specification forming part of Letters Patent No. 149,925, dated April 21, 1874; application filed March 10, 1874.

*To all whom it may concern:*

Be it known that we, THADDEUS GALVIN, JOHN GALVIN, and CHARLES LYNCH, of Detroit, in the county of Wayne and State of Michigan, have invented certain Improvements in Lubricators, of which the following is a specification:

Our invention consists of an oil-cup or lubricator for supplying oil to the journals of machinery, constructed as hereinafter described.

Figure 1 is a side elevation of our improved cup, shown partly in section. Figs. 2, 3, and 4 are portions shown in detail.

In constructing our device we provide a glass cup, A, of spherical form, with an opening at top and bottom, and having the edge of the glass around these openings turned out slightly to form a flange, as shown in Fig. 1. We then provide a metallic bottom piece, B, which has a central stem, E, projecting upward, and also a stem, $f$, projecting downward, as shown in Figs. 1 and 2, these being made tubular, as represented in Fig. 2. This bottom piece B is provided on its upper face with a flange, $a$, thus forming an annular recess around the stem E, within which we place a washer of rubber or leather for the bottom of the glass to rest upon, and to pack the joint so as to render it tight, the same as represented at the top in Fig. 1. The stem E has a screw-thread cut on its exterior to permit a nut, $h$, to be screwed thereon, as shown in Fig. 1, this nut bearing upon the inside of the cup A in such a manner as to secure the latter firmly to the base B, and hold it tight in place when the top C is removed. Two or more small holes, $e$, are drilled through the sides of the stem E, as represented in Figs. 1 and 2, for the oil to enter the nut $h$, being made oblong in form, or having its sides cut away, or holes made through it, as preferred, to permit the oil to pass down by it to the holes $e$.

It is obvious that the holes $e$ may be located above the nut $h$, if preferred, and that, by placing a packing under the nut or between it and the glass, the oil can be prevented from going below the nut in the cup.

To regulate the flow of oil we place inside of the stem E a valve, as shown in Fig. 2. This valve is shown enlarged in Fig. 4, and, as there represented, is made conical in form, and is attached loosely to a plug, D, which has a screw-thread on its exterior with a slot in its upper end, so as to adjust it by screwing it up or down within the stem E, which has a corresponding screw-thread on its interior, as shown in Fig. 2. The valve $o$ has on its upper end a spherical head, $n$, which is fitted loosely within a corresponding socket in the lower end of the plug D, the mouth of this socket being slightly compressed after the ball is inserted, thus fastening the valve to the plug, but leaving it loose, so that it can move freely by means of the ball-and-socket joint thus formed. The hole $i$, which extends downward through the base B and the stem $f$, is less in diameter than that in which the plug D fits above, thus forming a seat for the valve $o$, by which the flow of the oil can be entirely checked when desired. By adjusting the valve up or down the flow of the oil can be regulated with great accuracy.

The cover or cap C consists of a metallic piece provided with an annular flange similar to the flange $a$ on the base, for holding the rubber packing-ring $d$, that fits on the edge of the glass, as shown in Fig. 1, and it also has a central stem, $b$, with a screw-thread on its lower end, of such length and size as to fit within the upper end of the stem or tube E, as also shown in Fig. 1.

It will thus be seen that this cap C is not only firmly secured in place, but that it also serves to assist in securing or binding the cup A still more firmly to its base B, and that when removed there is left at the top of the cup an unobstructed opening of the full size of the hole for pouring in oil.

In Fig. 3 is shown a modified form or style of cap. In this the part C is made with the annular flange, as in the other; but, instead of the central stem $b$, we apply an elastic or rubber plug, $l$, through which passes a stem, having at its lower end a conical head, $m$, with a thumb-screw, $p$, applied at its upper end, so that, after this plug $l$ is inserted in the mouth of the cup A, by turning the nut $p$ the stem is drawn up, thereby expanding the plug and fastening it securely in the mouth of the cup.

The head $m$, instead of being conical, may be made flat, and by compressing the plug vertically when screwed up will expand it laterally, thus accomplishing the same result.

By this mode of construction we are enabled to provide a lubricator that is neat and strong, and that operates most satisfactorily. It is of great advantage to have the opening at the top unobstructed when the cap is removed for convenience in filling it with oil.

Having thus described our invention, what we claim is—

1. The tubular stem E, provided with one or more holes, e, in combination with the nut h, base B, and cup A, all constructed substantially as described.

2. The plug D, having the conical valve o attached thereto by a ball-and-socket joint, for use in an oil-cup, as set forth.

3. The cap C, provided with the stem b, in combination with the cup A and the stem or tube E, as and for the purpose set forth.

THADDEUS GALVIN.
JOHN GALVIN.
CHARLES LYNCH.

Witnesses:
EDWARD C. SCHRODER,
JOHN C. WINANS.